Patented Jan. 31, 1933

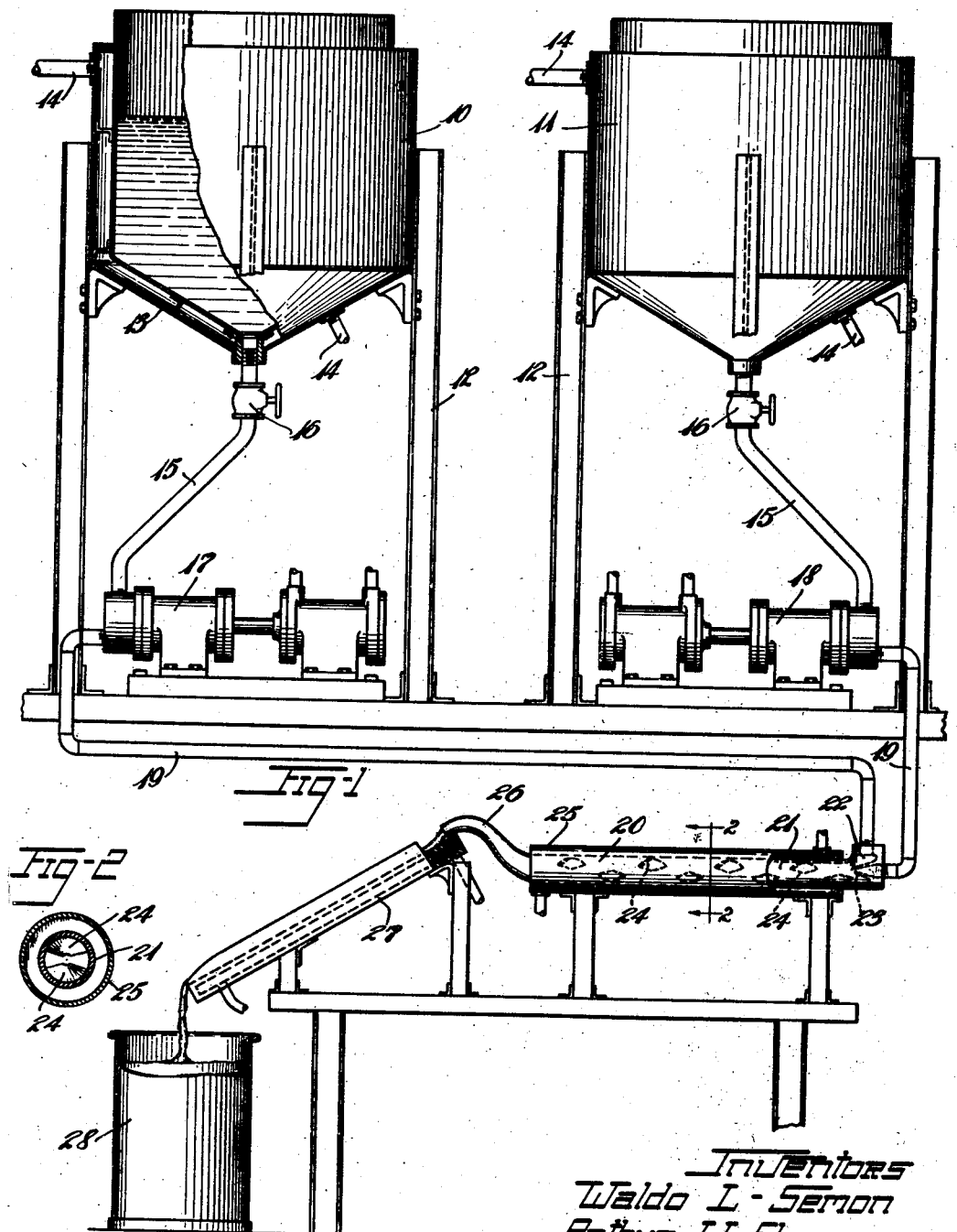

1,895,945

UNITED STATES PATENT OFFICE

WALDO L. SEMON, OF CUYAHOGA FALLS, AND ARTHUR W. SLOAN, OF AKRON, OHIO, ASSIGNORS TO THE B. F. GOODRICH COMPANY, OF NEW YORK, N. Y., A CORPORATION OF NEW YORK

METHOD OF MAKING ALDEHYDE-AMINES

Application filed December 20, 1928. Serial No. 327,309.

This invention relates to the art of manufacturing organic chemicals, and has for its object to provide an improved method of manufacturing aldehyde-amines.

The reaction products of aldehydes and amines have found very extensive use as vulcanization accelerators or as age-resisters in rubber compositions. For example, acetaldehyde-aniline, butyraldehyde-p-amino-dimethylaniline, heptaldehyde-aniline, acetaldehyde-o-toluidine, crotonaldehyde-aniline, etc., are excellent accelerators of vulcanization, whereas aldol-alpha-naphthylamine, butyraldehyde-alpha-naphthylamine, etc., are very effective age-resisters for rubber. Such aldehyde-amines are most commonly prepared by mixing the aldehyde and the amine in equimolecular proportions, or whatever other proportions may be found desirable, and heating the mixture until the reaction has proceeded and water has been eliminated. The molten aldehyde-amine is then drawn out of the reaction vessel and allowed to cool. Such batch methods of manufacture require the use of large steam-jacketed kettles and require the employment of considerable labor to supervise and conduct the operations.

This invention, in brief, consists in reacting aldehydes with amines continuously in a suitable apparatus. The exact procedure is susceptible of numerous variations, depending on the physical and chemical character of the respective aldehydes and amines, on the proportions of the materials reacted, on the temperature at which the reaction best takes place, etc. However, the essential feature is the continuous reaction of an aldehyde with an amine in a reaction tube or vessel, the product being discharged in a continuous stream therefrom.

An apparatus whereby the objects of this invention may be accomplished is illustrated in the accompanying drawing. Fig. 1 is a diagrammatic representation of the apparatus as a whole, while Fig. 2 is a section on a slightly larger scale through the line 2, 2 of Fig. 1.

Referring to Fig. 1 of the drawing, 10 and 11 are liquid reservoirs supported in any suitable manner as by the frame work 12, 12. The reservoirs are preferably equipped with jackets 13, which may be supplied through the pipes 14, 14 with a cooling or heating medium such as water or steam. The liquid contained in the respective reservoirs may be withdrawn through pipes 15, 15 equipped with shut-off valves 16, 16 and forced by the plunger pumps 17 and 18 through the pipes 19, 19 to the reaction vessel 20. The reaction vessel consists of a tube 21 equipped with an inlet 22 for the introduction of one of the reacting materials and a nozzle 23 whereby the other material is injected into and mixed with the first. The admixture of the two materials during their passage through the tube 21 is ensured by spiral baffles 24, 24. The baffles may be arranged in pairs as indicated in the sectional view of Fig. 2, alternate pairs being twisted in opposite directions, so as to change the direction of flow many times during the passage of the materials through the tube. The reaction tube is surrounded by a fluid jacket 25 by means of which it may conveniently be maintained at any desired temperature, and the end is bent in a gooseneck 26 to prevent the reacted materials from running out the end of the tube leaving it only partially filled. The mixture flowing from the gooseneck may be dried by allowing it to flow over a heated surface, such as the steam plate 27, heated by admitting steam to its hollow interior. The finished product is drained therefrom into suitable receptacles such as the can or drum 28.

The operation of the apparatus will be described with reference to the manufacture of the aldehyde-amine product known as aldol-naphthylamine, and extensively employed as an age-resister or anti-oxidant in rubber, although it is to be understood that any other aldehyde-amine may be prepared in the same or a similar manner.

The reservoir 10 is charged with solid alpha-naphthylamine, and the reservoir 11 with aldol. A small amount of acid, say 0.1% of concentrated hydrochloric acid is added to the aldol in reservoir 11 and thoroughly admixed therewith. Steam is admitted through the pipes 14, 14 to the jackets 13, 13 surrounding the reservoirs, until the alpha-naphthylamine has melted and the liquid in both reservoirs has attained a temperature of from 50° to 80° C. The valves 16, 16 are then opened and the pumps 17 and 18 started, the rate of operation of the pumps being so regulated that while pump 17 discharges 143 pounds of molten alpha-naphthylamine, pump 18 discharges 88 pounds of aldol; that is, that they discharge equimolecular proportions of the two substances. The two liquids discharged by the pumps flow into and through the reaction vessel 20, where they are thoroughly admixed. Steam is also admitted to the jacket 25 of the reaction vessel under sufficient pressure to maintain the reaction mixture at a temperature well above 100° C. At this temperature the reaction of the aldehyde and the amine takes place very rapidly, water being eliminated in the course of the reaction between the aldehyde and amine. Since the reaction is exothermic, the temperature of the product issuing from the reaction vessel will usually be considerably higher than even the temperature of the steam jacket. A final temperature of about 180° has been found satisfactory. The water formed by the reaction is present in the product in a finely divided form, but is evaporated therefrom as the product flows over the steam heated plate 27, where a large surface is exposed to the atmosphere. The finished dried product is then collected in suitable receptacles such as the thin-walled can 28 and is allowed to cool. The finished aldol-alpha-naphthylamine is a brittle, resinous amber-colored solid, which softens at slightly elevated temperatures and becomes fluid at about 80° C.

In the process described above, a small amount of a mineral acid was added to the aldol, for it has been found that the reaction of certain aldehydes with amines is greatly accelerated by the presence of a small proportion of such an acid, which appears to act as a reaction catalyst. However, any other moderately strong acid, such as sulphuric acid, phosphoric acid, salicylic acid, or even salts of strong acids with weak bases, or other substances possessing a definite acid reaction, may be substituted for the hydrochloric acid mentioned above. In many cases the natural acidity of the aldol or other aldehyde is sufficient to catalyze the reaction, but in the total absence of acid, as when the aldol is neutralized by a slight excess of sodium bicarbonate, the reaction does not take place. This property may be made useful, as further indicated below.

It has been found that a product substantially identical with that described above may be prepared by substituting acetaldehyde for the aldol. It is known that aldol is a condensation product, two molecules of acetaldehyde combining to form one mol of aldol. Apparently the same condensation takes place during the reaction of the acetaldehyde with the amine, aldol-alpha-naphthylamine being formed as the final product. Paraldehyde, which consists of three molecules of acetaldehyde loosely linked together, may equally well be employed. The paraldehyde decomposes readily into acetaldehyde, which undergoes the aldol condensation and reacts with the amine, with the formation again of the resinous aldol-alpha-naphthylamine. It was also found that, instead of reacting aldol and alpha-naphthylamine with the elimination of two molecules of water, a molecule of water may be eliminated from the aldol before its reaction, the product, crotonaldehyde, reacting with alpha-naphthylamine to form a final product very similar to that secured with aldol itself. It is evident, then, that it is immaterial whether the reaction is carried out with acetaldehyde or any of its simpler derivatives, namely paraldehyde, aldol, or crotonaldehyde, the products formed from all these substances being substantially identical. The choice as to which substance is selected in a given case is governed by considerations of convenience. Acetaldehyde has the disadvantage of being very volatile, aldol is a viscous syrupy liquid, and crotonaldehyde has an exceedingly pungent and disagreeable odor, while paraldehyde is a fairly stable mobile liquid with a fairly high boiling point.

The reaction need not be carried out at high temperatures since aldehyde and amines react at room temperature. Of course the reaction at room temperatures takes much longer, so that it is not usually convenient to carry it to completion in a reaction chamber at a low temperature. However, the process of this invention may be employed at a low temperature if desired. In such a case the aldehyde and amine are not heated any more than may be necessary to effect the admixture. The alpha-naphthylamine, for example, is heated only a few degrees above its melting point, while the aldol is heated only very little or not at all. The two ingredients are then mixed as hereinabove described, except that the reaction vessel is cooled instead of heated, the mixture thus being sufficiently cooled that substantially no reaction takes place in the reaction vessel. The mixture of the unreacted aldol and alpha-naphthylamine is drawn into cans, preferably conical in shape so that the contents may readily be removed, and allowed to stand at room temperatures for a day or two. As the reaction proceeds water separates out in minute droplets throughout the mass and the mixture solidifies. Finally the cans are inverted and the cake knocked out, ground and dried.

It is obvious that other proportions of the reacting materials may be employed; for example, two or more molecular proportions of aldehyde may be reacted with one molecular proportion of the amine. Furthermore, the ingredients may be mixed in a different order from that described above. Thus if the reaction is carried out at high temperatures, the acid catalyst may be mixed with the amine instead of with the aldehyde and the two reacted as described above. Or, if desired, the aldehyde may be neutralized with a slight excess of sodium bicarbonate or other base and mixed with the amine in one reservoir, no reaction taking place until acid is added thereto, while a dilute acid solution is prepared in the other reservoir. The mixture of the unreacted aldehyde and amine is then mixed with the acid in the heated reaction vessel, the reaction taking place almost instantaneously. If, on the other hand, it is desired to allow the reaction to proceed at a low temperature over a considerable time, the aldehyde-amine mixture and the acid are continuously mixed in the well-cooled reaction vessel, the product being drawn into cans and allowed to stand until the reaction is complete.

The reaction may even be carried out in solution, one or both of the reacting materials being dissolved in water, alcohol, or other suitable solvent. In this case it will usually be necessary to employ a larger proportion of acid to catalyze the reaction, sometimes even as much as a molecule of acid for each molecule of amine. The product is precipitated in the form of fine particles suspended in the acid solution. The solution must be neutralized and the aldehyde-amine filtered off and dried.

If it is intended to prepare other age-resisting aldehyde-amines than aldol-alpha-naphthylamine, or even if it is desired to prepare accelerating aldehyde-amines, the method of this invention may be employed, with such minor modifications as may be required by the physical properties of the respective reacting materials, their melting points, boiling points, viscosity, etc., or by their chemical properties such as their reactivity, etc. Thus the following aldehyde-amines or the corresponding poly-aldehyde-amines may very readily and economically be prepared by such a continuous process: acetaldehyde-aniline, furfuraldehyde-ortho-toluidine, butyraldehyde-aniline, butyraldehyde-alpha-naphthylamine, heptaldehyde-aniline, butyraldehyde-butylamine, acetaldehyde-p-amino-diphenylamine, formaldehyde-piperidine, etc.

While we have herein disclosed with considerable particularity certain preferred manners of performing our invention, we do not thereby desire or intend to limit ourselves solely thereto, for, as hitherto stated, the procedure may be modified, the precise proportions of the materials utilized may be varied and other materials having equivalent chemical properties may be employed if desired without departing from the spirit and scope of the invention as defined in the appended claims.

We claim:

1. The method of manufacturing aldehyde-amines which comprises continuously admixing an aldehyde and an amine in fixed, predetermined proportions, and causing the reaction thereof.

2. The method of manufacturing aldehyde-amines which comprises continuously admixing an aliphatic aldehyde and an amine in fixed, predetermined proportions, and causing the reaction thereof.

3. The method of manufacturing aldehyde-amines which comprises continuously admixing an aliphatic aldehyde and an aromatic amine in fixed, predetermined proportions, and causing the reaction thereof.

4. The method of manufacturing aldehyde-amines which comprises continuously admixing an aliphatic aldehyde and a primary aromatic amine at their reaction temperature and in the presence of a small proportion of an acid catalyst in fixed, predetermined proportions.

5. The method of manufacturing aldehyde-amines which comprises heating an aliphatic aldehyde and an aromatic amine to a temperature approaching that required for their rapid reaction, and continuously admixing them in fixed, predetermined proportions in the presence of a small proportion of an acid catalyst.

6. The method of manufacturing aldehyde-amines which comprises continuously admixing an aliphatic aldehyde and a primary aromatic amine in fixed, predetermined proportions in the presence of a small proportion of an acid catalyst and heating the mixture to its reaction temperature.

7. The method of manufacturing aldehyde-amines which comprises continuously separately heating an aliphatic aldehyde and a primary aromatic amine, and mixing them in the presence of a small proportion of an acid catalyst in a reaction vessel heated to their reaction temperature, and continuously withdrawing the product.

8. The method of manufacturing aldehyde-amines which comprises continuously admixing an aliphatic aldehyde and a naphthylamine, subjecting the mixture to a moderately elevated temperature, and continuously withdrawing the product.

9. The method of manufacturing aldehyde-amines which comprises continuously admixing a naphthylamine and a substance selected from the class consisting of acetaldehyde, paraldehyde, aldol, and crotonaldehyde, in fixed, predetermined proportions, and subjecting the mixture to a moderately elevated temperature.

10. The method of manufacturing aldehyde-amines which comprises continuously admixing a naphthylamine, a small proportion of a strong acid catalyst and a substance selected from the class consisting of acetaldehyde, paraldehyde, aldol, and crotonaldehyde, in fixed, predetermined proportions, and subjecting the mixture to a moderately elevated temperature.

11. The method of manufacturing aldehyde-amines which comprises continuously admixing alpha-naphthylamine with a substance selected from the class consisting of acetaldehyde, paraldehyde, aldol, and crotonaldehyde in a reaction vessel heated to a temperature exceeding 100° C. and continuously withdrawing the product.

12. The method of manufacturing aldehyde-amines which comprises continuously admixing aldol and alpha-naphthylamine in fixed, predetermined proportions, and causing the reaction thereof.

13. The method of manufacturing aldehyde-amines which comprises continuously admixing aldol, alpha-naphthylamine, and a small proportion of a strong acid catalyst in fixed, predetermined proportions, and causing the reaction thereof.

14. The method of manufacturing aldehyde-amines which comprises continuously admixing aldol and alpha-naphthylamine, subjecting the mixture to a moderately elevated temperature, and continuously withdrawing the product.

15. The method of manufacturing aldehyde-amines which comprises continuously admixing aldol, alpha-naphthylamine, and a small proportion of a strong acid catalyst, subjecting the mixture to a moderately elevated temperature, and continuously withdrawing the product.

16. The method of manufacturing aldehyde-amines which comprises continuously admixing aldol, alpha-naphthylamine, and a small proportion of a strong acid catalyst, heating the mixture to a reacting temperature, continuously withdrawing the product, and evaporating the water therefrom.

17. The method of manufacturing aldehyde-amines which comprises continuously admixing substantially equimolecular proportions of aldol and alpha-naphthylamine at a temperature above 100° C. in the presence of a small proportion of a strong acid catalyst, continuously withdrawing the product, and evaporating the water contained in the product.

18. The method of manufacturing aldehyde-amines which comprises separately heating alpha-naphthylamine and aldol containing a small proportion of a strong acid catalyst, admixing them continuously in substantially equimolecular proportions in a heated reaction vessel, continuously withdrawing the product, and evaporating the water formed during the reaction.

19. The method of manufacturing aldehyde-amines which comprises mixing aldol and alpha-naphthylamine at substantially room tempreature in the presence of a small proportion of acid catalyst, allowing the mixture to stand until the reaction is substantially complete, and comminuting and drying the product.

20. The method of manufacturing aldehyde-amines which comprises continuously mixing aldol and alpha-naphthylamine at substantially room temperature in the presence of a small proportion of an acid catalyst, continuously withdrawing the mixture, allowing it to stand until the reaction is substantially complete, and comminuting and drying the product.

In witness whereof we have hereunto set our hands this 8th day of December, 1928.

WALDO L. SEMON.
ARTHUR W. SLOAN.